United States Patent
Ou et al.

(10) Patent No.: US 9,820,020 B2
(45) Date of Patent: Nov. 14, 2017

(54) GROOMING METHOD AND DEVICE FOR PACKET OPTICAL TRANSPORT NETWORK

(71) Applicant: Xi'an Zhongxing New Software Co., Ltd., Xi'an, Shaanxi (CN)

(72) Inventors: Xuegang Ou, Shenzhen (CN); Xin Si, Shenzhen (CN); Jie Chen, Shenzhen (CN); Hongbin Yu, Shenzhen (CN); Wei Luo, Shenzhen (CN); Xingming Li, Shenzhen (CN)

(73) Assignee: Xi'an Zhongxing New Software Co., Ltd., Shaanxi (CN)

( * ) Notice: Subject to any disclaimer, the term of this patent is extended or adjusted under 35 U.S.C. 154(b) by 0 days.

(21) Appl. No.: 15/024,965

(22) PCT Filed: Apr. 16, 2014

(86) PCT No.: PCT/CN2014/075453
§ 371 (c)(1),
(2) Date: Mar. 25, 2016

(87) PCT Pub. No.: WO2014/180228
PCT Pub. Date: Nov. 13, 2014

(65) Prior Publication Data
US 2016/0249118 A1 Aug. 25, 2016

(30) Foreign Application Priority Data

Sep. 27, 2013 (CN) .......................... 2013 1 0452296

(51) Int. Cl.
*H04Q 11/00* (2006.01)
*H04J 14/02* (2006.01)
*H04L 12/24* (2006.01)

(52) U.S. Cl.
CPC ...... *H04Q 11/0062* (2013.01); *H04J 14/0256* (2013.01); *H04L 41/12* (2013.01);
(Continued)

(58) Field of Classification Search
None
See application file for complete search history.

(56) References Cited

U.S. PATENT DOCUMENTS

2012/0301143 A1 11/2012 Shimizu

FOREIGN PATENT DOCUMENTS

| CN | 1791000 A | 6/2006 |
|---|---|---|
| CN | 102970225 A | 3/2013 |
| EP | 1335627 A2 | 8/2003 |

OTHER PUBLICATIONS

Supplementary European Search Report of EP14794779, dated Jul. 12, 2016.

(Continued)

*Primary Examiner* — Darren E Wolf
(74) *Attorney, Agent, or Firm* — Banner & Witcoff, Ltd.

(57) ABSTRACT

A grooming method and apparatus for a packet optical transport network are disclosed. The method includes: according to an arrangement order of various services, planning a path from a service source node to a service target node in an ith service in a topology set graph; when the path includes a wavelength link in a physical link, removing the wavelength link, and establishing a virtual link between a link source node and a link target node of the removed wavelength link; updating capacities of various links in the path; calculating a weight of a newly established virtual link, and adding the newly established virtual link and the corresponding weight to the topology set graph; and planning a path from a service source node to a service target node in an i+1th service in the topology set graph, until all services are finished.

14 Claims, 8 Drawing Sheets

(52) U.S. Cl.
CPC ... *H04Q 11/0003* (2013.01); *H04Q 2011/009* (2013.01); *H04Q 2011/0088* (2013.01)

(56) References Cited

OTHER PUBLICATIONS

M.M. Hasan et al, "Traffic Grooming in Green Optical Network", 2013 IEEE International Conference on communications, May 27, 2010, pp. 1-5.

Song Yang et al, "Energy-aware path selection for scheduled lightpaths in IP-over-WDM Networks", Communications and Vehicular Technology in the Benelux, 2011 18th IEE Symposium on, IEEE, Nov. 22, 2011, pp. 1-6.

Ming Xia et al, "Green Provisioning for Optical WDM Networks" IEEE Journal of Selected Topics in Quantum Electronics, IEEE Service Center, Piscataway, NJ, vol. 17, No. 2, Jul. 12, 2010, pp. 437-445.

International Search Report of PCT/CN2014/075453, dated Aug. 4, 2014.

| Network device | Power consumption values |
|---|---|
| Amplifier | 8W |
| Transmitter | 73W |
| Receiver | 30W |
| ROADM | 5W |
| Router port | 1000W |
| OTN layer device port | 200W |

| Service ID | Service source node | Service target node | The type of service | Service direction | Service bandwidth |
|---|---|---|---|---|---|
| 1 | A | F | OCH service | Bidirectional | 10G |
| 2 | A | C | OCH service | Bidirectional | 10G |
| 3 | A | I | OCH service | Bidirectional | 10G |
| 4 | D | I | OCH service | Bidirectional | 2.5G |
| 5 | H | F | Ethernet service | Bidirectional | 1G |
| 6 | H | E | Ethernet service | Bidirectional | 1G |

FIG. 7

| Service ID | Service source node | Service target node | Actual physical links passed by the service | Virtual links passed by the service |
|---|---|---|---|---|
| 1 | A | F | A-D, D-E, E-F | A-F(OTN Virtual link) |
| 2 | A | C | A-B, B-C | A-C(OTN Virtual link) |
| 3 | A | I | A-B, B-C, C-I | A-C(OTN Virtual link)C-I(OTN Virtual link) |
| 4 | D | I | D-A, A-B, B-C, C-I | D-A(OTN Virtual link)A-C(OTN Virtual link)C-A(OTN Virtual link) |
| 5 | H | F | H-I, I-C, C-F | H-F(Packet layer virtual link)The included OTN layer virtual links are(H-I, I-C, C-F) |
| 6 | H | E | H-I, I-C, C-F, F-E | H-F(Packet layer virtual link)F E(Packet layer virtual link), The included OTN layer virtual links are(H-I, I-C, C-F, F-E) |

FIG. 8

| Virtual link | Type of the virtual link | Actual physical links passed | Advanced ODU level in the wave (or an ODU container directly encapsulating the LSP, this is for the packet layer virtual link) | Capacity used in the an advanced ODU container (or capacity used by an ODU container directly encapsulating the LSP) |
|---|---|---|---|---|
| A-F | OTN layer virtual link | A-D,D-E,E-F | service directly encapsulated in the wave | OCH service is not required to be encapsulated by the ODU container |
| A-C | OTN layer virtual link | A-B,B-C | ODU3 | 22.5G |
| C-I | OTN layer virtual link | C-I | ODU3 | 15G |
| D-A | OTN layer virtual link | D-A | ODU1 | 2.5G |
| H-I | OTN layer virtual link | H-I | ODU1 | 2.5G |
| C-F | OTN layer virtual link | C-F | ODU1 | 2.5G |
| H-F | Packet layer virtual link | H-I, I-C,C-F | ODU1 | 2G |
| F-E | OTN layer virtual link | F-E | ODU1 | 1.25G |
| F-E | Packet layer virtual link | F-E | ODU0 | 1G |

FIG. 9

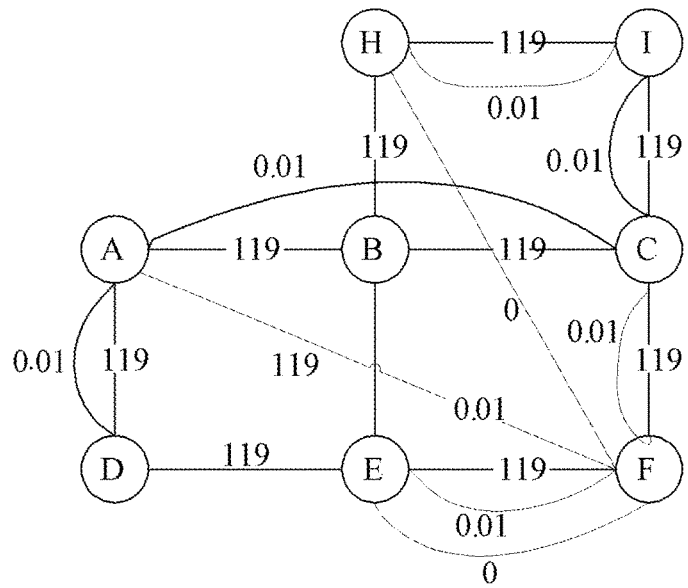

FIG. 10

GROOMING METHOD AND DEVICE FOR PACKET OPTICAL TRANSPORT NETWORK

TECHNICAL FIELD

The present document relates to the field of network technology, and particularly, to a grooming method and apparatus for a packet optical transport network.

BACKGROUND OF THE RELATED ART

The Packet Optical Transport Network (POTN) technology is substantially a deep integration of the packet technology and the optical transport technology after the Packet Transport Network (PTN) technology. It not only has the packet processing capability of the PTN, but also integrates the enhanced line side bandwidth and transport distance of the Optical Transport Network (OTN) technology. In the metropolitan area network of the operators in our country, the POTN will be first applied in the core and the convergence layer of the metropolitan area network, and with the promotion of the capacity requirements of the access layer, it extends to the access layer step by step. Main services borne by the network include: an ethernet service, a Synchronous Transport Module (STM) time-division service, an Oracle Database Unloader (ODU) service and an Optical Channel (OCH) service.

In the traditional network routing algorithm, generally the shortest path algorithm is adopted to make a routing selection. The shortest path algorithm takes a distance between nodes as a weight, calculates a path with the minimum weight from a source node to a target node to complete the routing. Though the shortest path algorithm minimizes the price of distance and length, the power consumption problem is not considered. Thus the power consumption of the path obtained by using the shortest path algorithm is not always the minimum, which goes against the energy saving.

SUMMARY OF THE INVENTION

The embodiment of the present invention provides a grooming method and apparatus for a packet optical transport network, which can minimize the power consumption of services in the network, thereby optimizing the power consumption of the entire network to the greatest extent.

The embodiment of the present invention provides a grooming method for a packet optical transport network, which comprises steps:

step A, according to an arrangement order of various services, planning a path from a service source node to a service target node in an ith service in a topology set graph; wherein an initial value of i is 1;

step B, when the path comprises a wavelength link in a physical link, removing the wavelength link, and establishing a virtual link between a link source node and a link target node of the removed wavelength link;

step C, updating capacities of various links in the path;

step D, calculating a weight of a newly established virtual link, and adding the newly established virtual link and the corresponding weight to the topology set graph; and step E, if i+1, returning to the step A, until all services are finished, wherein, i is a positive integer.

Preferably, when the ith service is an OCH service, the step B comprises:

step B11, when a found path comprises a wavelength link in a physical link, removing the wavelength link, and establishing an OTN layer virtual link between a link source node and a link target node of the removed wavelength link; and step B12, when no path is found, determining that service path searching fails, and executing the step E.

Preferably, when the ith service is an ODU service or an STM service, the step B comprises:

step B21, when a found path comprises a wavelength link in a physical link, removing the wavelength link, and establishing an OTN layer virtual link between a link source node and a link target node of the removed wavelength link;

step B22, when a found path comprises an OTN layer virtual link, retaining the OTN layer virtual link;

step B23, when a physical link comprised in a newly established OTN layer virtual link has existed in an old OTN layer virtual link, and a capacity of the old OTN layer virtual link meets capacity requirements of the ith service, splitting the old OTN layer virtual link into a plurality of OTN layer virtual sublinks;

step B24, calculating the sum of power consumptions P1 of the plurality of OTN layer virtual sublinks, power consumption P2 of the newly established OTN layer virtual link, and power consumption P3 of the old OTN layer virtual link;

step B25, when P1 ≤ P2+P3, removing the newly established OTN layer virtual link, and establishing a virtual link according to the plurality of split OTN layer virtual sublinks for the old OTN layer virtual link;

step B26, when P1>P2+P3, retaining the newly established OTN layer virtual link; and step B27, when no path is found, determining that service path searching fails, and executing the step E.

Preferably, when the ith service is an ethernet service, the step B comprises:

step B31, when a found path comprises a wavelength link in a physical link, removing the wavelength link, and respectively establishing an OTN layer virtual link and a packet layer virtual link between a link source node and a link target node of the removed wavelength link;

step B32, when a found path comprises a packet layer virtual link, establishing a packet layer virtual link between a link source node and a link target node of the OTN layer virtual link;

step B33, when a found path comprises a packet layer virtual link, retaining the packet layer virtual link;

step B34, when a physical link comprised in a newly established OTN layer virtual link has existed in an old OTN layer virtual link, and a capacity of the old OTN layer virtual link meets capacity requirements of the ith service, splitting the old OTN layer virtual link into a plurality of OTN layer virtual sublinks;

step B35, calculating the sum of power consumptions P1 of the plurality of OTN layer virtual sublinks, power consumption P2 of the newly established OTN layer virtual link, and power consumption P3 of the old OTN layer virtual link;

step B36, when P1 ≤ P2+P3, removing the newly established OTN layer virtual link, and establishing the virtual link according to the plurality of split OTN layer virtual sublinks for the old OTN layer virtual link;

step B37, when P1×P2+P3, retaining the newly established OTN layer virtual link; and step B38, when no path is found, determining that service path searching fails, and executing the step E.

Preferably, before the step A, the method further comprises:

sorting categories of various services, and arranging OCH services at first place, ODU services and STM services at second place, and ethernet services at last place; and orderly arranging the OCH services from large to small according to service capacities, orderly arranging the ODU services and STM services from large to small according to service capacities, and orderly arranging the ethernet services from high to low according to priorities.

Preferably, before the step A, the method further comprises:

calculating a weight $W_j=P_T+N_0 \times P_A+P_R$ of a jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and updating the weight $W_j$ of the jth segment of physical link to a corresponding physical link in the topology set graph, wherein, j and $N_0$ are positive integers.

The embodiment of the present invention further discloses a grooming apparatus for a packet optical transport network, which comprises:

a path planning module, configured to: according to an arrangement order of various services, plan a path from a service source node to a service target node in an ith service in a topology set graph; wherein an initial value of i is 1;

a link establishment module, configured to: when the path comprises a wavelength link in a physical link, remove the wavelength link, and establish a virtual link between a link source node and a link target node of the removed wavelength link;

a capacity update module, configured to: update capacities of various links in the path; and a topology set graph update module, configured to: calculate a weight of a newly established virtual link, and add the newly established virtual link and the corresponding weight to the topology set graph, wherein, i is a positive integer.

Preferably, when the ith service is an OCH service, the link establishment module is configured to:

when a found path comprises a wavelength link in a physical link, remove the wavelength link, and establish an optical transport network OTN layer virtual link between a link source node and a link target node of the removed wavelength link; and when no path is found, determine that service path searching fails.

Preferably, when the ith service is an ODU service or an STM service, the link establishment module is configured to:

when a found path comprises a wavelength link in a physical link, remove the wavelength link, and establish an OTN layer virtual link between a link source node and a link target node of the removed wavelength link;

when a found path comprises an OTN layer virtual link, retain the OTN layer virtual link;

when a physical link comprised in a newly established OTN layer virtual link has existed in an old OTN layer virtual link, and a capacity of the old OTN layer virtual link meets capacity requirements of the ith service, split the old OTN layer virtual link into a plurality of OTN layer virtual sublinks;

calculate the sum of power consumptions P1 of the plurality of OTN layer virtual sublinks, power consumption P2 of the newly established OTN layer virtual link, and power consumption P3 of the old OTN layer virtual link;

when $P1 \leq P2+P3$, remove the newly established OTN layer virtual link, and establish the virtual link according to the plurality of split OTN layer virtual sublinks for the old OTN layer virtual link;

when $P1>P2+P3$, retain the newly established OTN layer virtual link; and when no path is found, determine that service path searching fails.

Preferably, when the ith service is an ethernet service, the link establishment module is configured to:

when a found path comprises a wavelength link in a physical link, remove the wavelength link, and respectively establish an OTN layer virtual link and a packet layer virtual link between a link source node and a link target node of the removed wavelength link;

when a found path comprises a packet layer virtual link, establish a packet layer virtual link between a link source node and a link target node of the OTN layer virtual link;

when a found path comprises a packet layer virtual link, retain the packet layer virtual link;

when a physical link comprised in a newly established OTN layer virtual link has existed in an old OTN layer virtual link, and a capacity of the old OTN layer virtual link meets capacity requirements of the ith service, split the old OTN layer virtual link into a plurality of OTN layer virtual sublinks;

calculate the sum of power consumptions P1 of the plurality of OTN layer virtual sublinks, power consumption P2 of the newly established OTN layer virtual link, and power consumption P3 of the old OTN layer virtual link;

when $P1 \leq P2+P3$, remove the newly established OTN layer virtual link, and establish the virtual link according to the plurality of split OTN layer virtual sublinks for the old OTN layer virtual link;

when $P1>P2+P3$, retain the newly established OTN layer virtual link; and when no path is found, determine that service path searching fails.

Preferably, the grooming apparatus for the packet optical transport network further comprises a service sorting module, configured to:

sort categories of various services, and arrange OCH services at first place, ODU services and STM services at second place, and ethernet services at last place; and orderly arrange the OCH services from large to small according to service capacities, orderly arrange the ODU services and STM services from large to small according to service capacities, and orderly arrange the ethernet services from high to low according to priorities.

Preferably, the topology set graph update module is further configured to:

calculate a weight $W_j=P_T+N_0 \times P_A+P_R$ of a jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and update the weight $W_j$ of the jth segment of physical link to a corresponding physical link in the topology set graph, wherein, j and $N_0$ are positive integers.

In the embodiments of the present invention, the wavelength link in the path is converted into the virtual link, the service path planning and wavelength allocation are finished with the power consumption as a weight between the nodes, so as to obtain a path with the minimum power consumption to implement the service routing, which is conducive to reducing the power consumption of services, thereby optimizing the power consumption of the entire network to the greatest extent.

BRIEF DESCRIPTION OF DRAWINGS

FIG. 7 is an information table of services to be planned in the embodiment of the present invention;

FIG. 8 is a table of actual physical links and virtual links passed by the services in the embodiment of the present invention;

FIG. 9 is an information table of virtual links in the embodiment of the present invention;

FIG. 10 is a planned topology set graph in the embodiment of the present invention;

The implementation of the object, function characteristics and advantages of the embodiments of the present invention will be correspondingly described in combination with the embodiments and with reference to the accompanying drawings.

PREFERRED EMBODIMENTS OF THE INVENTION

It should be understood that, the specific embodiments described here are only used to explain the present document, which is not used to limit the present document. It should be noted that the embodiments in the present invention and the characteristics in the embodiments can be arbitrarily combined with each other in the case of no conflict.

Figure 1:
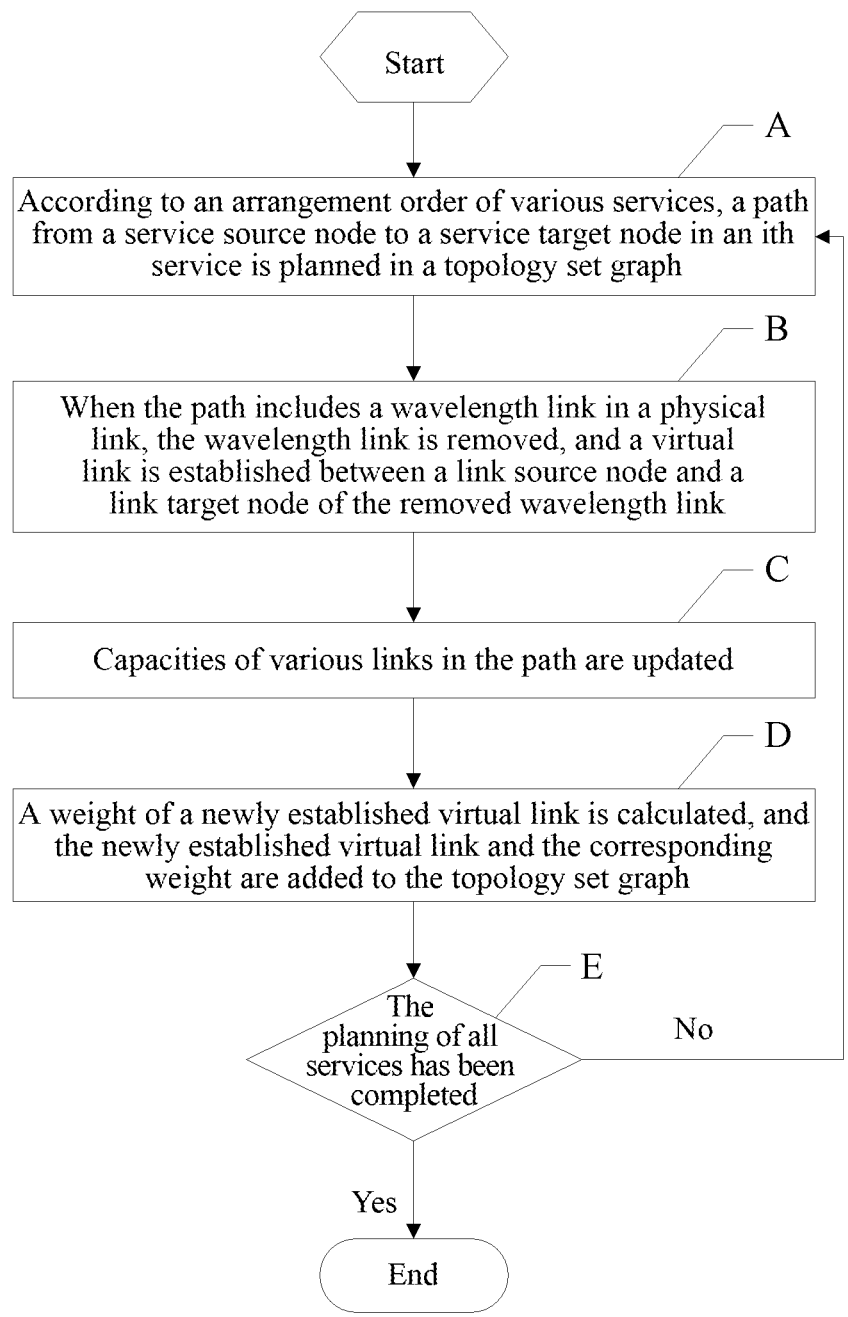
FIG. 1 is a flowchart of a grooming method for a packet optical transport network according to the first embodiment of the present invention.

As shown in FIG. 1, FIG. 1 is a flowchart of a grooming method for a packet optical transport network according to the first embodiment of the present invention. The grooming method for the packet optical transport network mentioned in the embodiment includes the following steps:

in step A, according to an arrangement order of various services, a path from a service source node to a service target node in an ith service is planned in a topology set graph; and an initial value of i is 1;

in the embodiment, the POTN network is mainly divided into three layers: a packet layer, an OTN layer and a Wavelength Division Multiplexing (WDM) layer. The topology of the WDM layer is a physical topology of the entire network in essence, the OTN layer is a virtual topology composed of optical paths and the packet layer is a virtual topology composed of Oracle Database Unloader (ODU) pipelines. Since paths that may be found in the path searching in the embodiment include physical links and virtual links, the three topologies are assembled together to form a topology set graph.

When the POTN network is planned, the following condition is taken as a limitation: the topological structure of the POTN network has been known according to the practical applications, including the number of nodes and the node connectivity situation; there may be a plurality of physical links between the nodes in the topology of the POTN network, and each physical link has two optical fibers in opposite direction; and one optical fiber in the topology of the POTN network has a plurality of waves, namely wavelength links, and the number of waves in each optical fiber is not always equal.

Before the path is planned, various services are sorted, and they are sorted according to categories of various services. The OCH services are arranged at first place, followed by the ODU services and STM services, and the ethernet services are arranged at last place. The OCH services are orderly arranged from large to small according to service capacities, the ODU services and STM services are orderly arranged from large to small according to service capacities, and the ethernet services are orderly arranged from high to low according to priorities. According to an arranged order, starting from the first service, one service is selected to perform the path planning, and the Dijkstra's algorithm is adopted to perform the path searching in the topology set graph. In addition, one duplicate graph may be firstly established according to the topology set graph, and the path searching is performed in the duplicate graph.

The path planned in the topology set graph may include wavelength links and/or virtual links in the physical link. In the stage of network initialization, the weights of various links in the topology set graph are calculated. Since the capacity of the wavelength channel in the initial state is not occupied, the sides are all actual physical links at this point. The power consumption is taken as a weight between the nodes in the embodiment, the power consumption occupied by the physical link normally include the sum of power consumptions of an optical transmitter, optical amplifier and optical receiver in the link. The weight $W_j = P_T + N_O \times P_A + P_R$ of a jth segment of physical link in the topology set graph is calculated, wherein $P_T$ is the power consumption of the optical transmitter in the jth segment of physical link, $P_A$ is the power consumption of the optical amplifier in the jth segment of physical link, $P_R$ is the power consumption of the optical receiver in the jth segment of physical link, and $N_O$ is the number of optical amplifiers in the jth segment of physical link. Here the value of the $N_O$ may be decided based on a ratio of an actual length of the link to the intervals amplifiers are placed at. The weight $W_j$ of the jth segment of physical link is updated to a corresponding physical link in the topology set graph, and the initialization of the topology set graph is completed, wherein, j and $N_O$ are positive integers.

In step B, when the path includes a wavelength link in a physical link, the wavelength link is removed, and a virtual link is established between a link source node and a link target node of the removed wavelength link;

moreover, the virtual link represents a routing path that has been established in the physical topology, and if a new service connection request in the routing needs to use such segment of virtual link, as long as the capacity of the link allows, the routing in the link does not need any power consumption. Therefore, the wavelength link included in the path planned in the embodiment is removed, and the virtual link is established between the nodes at the two ends of the removed wavelength link, thus during the service routing, the power consumptions of the physical link and the virtual link are taken as the weight, and the service routing is performed according to the principle of minimum power consumption, which is conducive to reducing the power consumption of the service routing.

In step C, the capacities of various links in the path is updated;

After the replanning of the path is completed, the service capacity is deducted from the capacity of the links (including the physical links and the virtual links) passed by the routing, and the remaining capacity of the links is obtained, to prepare for checking whether there is enough remaining capacity to meet the requirements of the service capacity when it is to plan a path of the next service in the following. Moreover, if the remaining capacity in the links cannot meet the requirements of the service capacity yet, in order to ensure smooth routing of the service, virtual links whose remaining capacity is less than the service capacity may be deleted. For example, when the service is the OCH service, all virtual links whose remaining capacity is less than the service capacity are deleted, and when the service is the ODU service or STM service, all packet layer virtual links whose remaining capacity is less than the service capacity are deleted.

In step D, a weight of the newly established virtual link is calculated, and the newly established virtual link and the corresponding weight are added to the topology set graph;

in the embodiment, when the capacity of the virtual link allows, the routing in the link does not need any power consumption, thus the weight of the virtual link may be represented as: a weight $W_{v1}=0.01$ of the OTN layer virtual link and a weight $W_{v2}=0$ of the packet layer virtual link. The newly established virtual link and the corresponding weight are added to the topology set graph for the path searching of the next service, and the planning of the current service is finished.

In step E, whether the planning of all services is completed; if the planning of all services is completed, the flow ends; and if the planning of all services is not completed, then i+1, and it returns to the step A.

In the embodiment, the wavelength link in the path is converted into the virtual link, the service path planning and wavelength allocation are finished with the power consumption as a weight between the nodes, so as to obtain a path with the minimum power consumption to implement the service routing, which is conducive to reducing the power consumption of services, thereby optimizing the power consumption of the entire network to the greatest extent.

Figure 2:
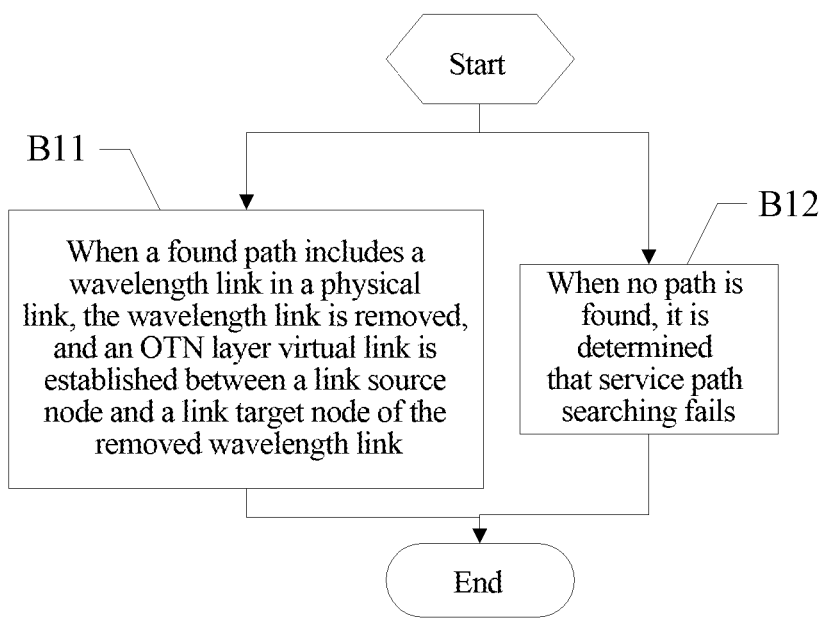
FIG. 2 is a flowchart of a grooming method for a packet optical transport network according to the second embodiment of the present invention.

As shown in FIG. 2, FIG. 2 is a flowchart of a grooming method for a packet optical transport network according to the second embodiment of the present invention. In the embodiment, based on the embodiment shown in FIG. 1, when the ith service is the OCH service, the step B includes:

step B11, when a found path includes a wavelength link in a physical link, removing the wavelength link, and establishing an OTN layer virtual link between a link source node and a link target node of the removed wavelength link;

step B12, when no path is found, determining that the service path searching fails, and executing the step E.

In the embodiment, when the type of service is the OCH service, since the OCH service is arranged at the first place during the sorting, all found paths are basically wavelength links at this point. The wavelength links refer to one wave contained in the physical link, and these wavelength links are removed, that is, the wave is deleted from the corresponding physical link, and one OTN layer virtual link directly connecting a source node with a target node is established. If no path is found, it indicates that the service path establishment fails, and the path planning of the next service is performed.

In the embodiment, the wavelength link in the path of the OCH service is converted into the virtual link, the service path planning and wavelength allocation are finished with the power consumption as a weight between the nodes, so as to obtain a path with the minimum power consumption to implement the service routing, which is conducive to reducing the power consumption of the OCH service.

Figure 3:
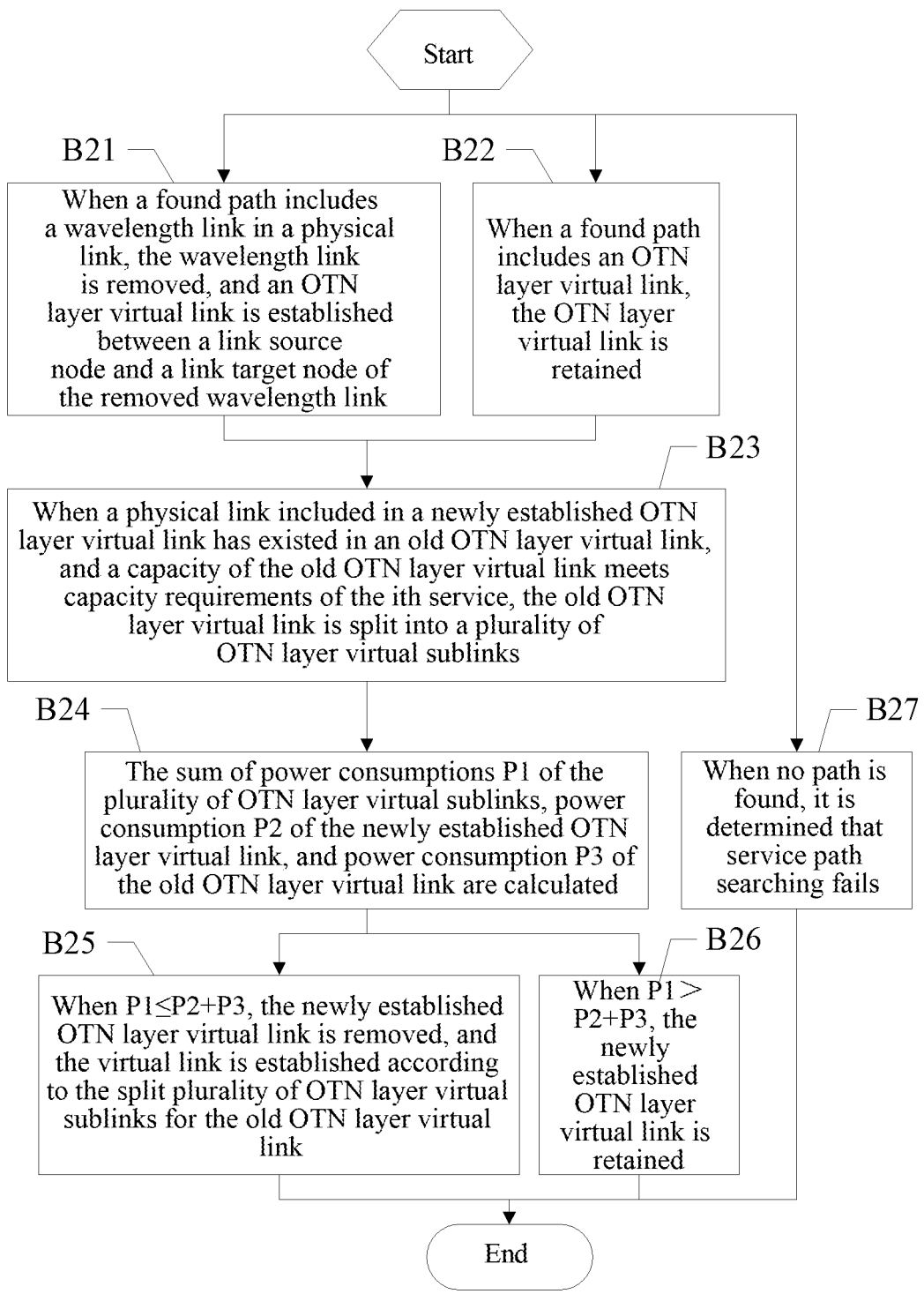
FIG. 3 is a flowchart of a grooming method for a packet optical transport network according to the third embodiment of the present invention.

As shown in FIG. 3, FIG. 3 is a flowchart of a grooming method for a packet optical transport network according to the third embodiment of the present invention. In the embodiment, based on the embodiment shown in FIG. 1, when the ith service is the ODU service or STM service, the step B includes:

step B21, when a found path includes a wavelength link in a physical link, removing the wavelength link, and establishing an OTN layer virtual link between a link source node and a link target node of the removed wavelength link;

step B22, when a found path includes an OTN layer virtual link, retaining the OTN layer virtual link;

step B23, when a physical link included in a newly established OTN layer virtual link has existed in an old OTN layer virtual link, and a capacity of the old OTN layer virtual link meets capacity requirements of the ith service, splitting the old OTN layer virtual link into a plurality of OTN layer virtual sublinks;

step B24, calculating the sum of power consumptions P1 of the plurality of OTN layer virtual sublinks, power consumption P2 of the newly established OTN layer virtual link, and power consumption P3 of the old OTN layer virtual link;

step B25, when $P1 \leq P2+P3$, removing the newly established OTN layer virtual link, and establishing the virtual link according to the plurality of split OTN layer virtual sublinks for the old OTN layer virtual link;

step B26, when $P1>P2+P3$, retaining the newly established OTN layer virtual link;

step B27, when no path is found, determining that service path searching fails, and executing the step E.

In the embodiment, when the type of service is the ODU service or STM service, the following cases are included:

in the first case, if the paths found are all wavelength links, the wavelength links are removed, and one OTN layer virtual link directly connecting a source node with a target node is established;

in the second case, if the links passed by the path are all OTN layer virtual links, the OTN layer virtual links are retained;

in the third case, if the links passed by the path include the wavelength links and the OTN layer virtual links, all wavelength link sets are found, the wavelength links are removed, and corresponding OTN layer virtual links are established;

in the fourth case, if no path is found, it indicates that the service path establishment fails, and the path planning of the next service is performed.

In the above cases, if the newly established OTN layer virtual link contains actual physical links and the physical links have been contained in a certain old OTN layer virtual link, and the capacity of the existing old OTN layer virtual link can meet the capacity requirements of the new service, it is assumed that the old OTN layer virtual link is split into two or three OTN layer virtual sublinks, the sum of power consumptions P1 consumed by the OTN layer virtual sublinks is calculated, and the sum of power consumptions P2+P3 consumed by the newly established OTN layer virtual link and the old OTN layer virtual link is calculated, and it is to compare P1 with P2+P3. If P1 ≤ P2+P3, it indicates that the power consumptions of the virtual sublinks are smaller, based on the principle of minimum power consumption, the old OTN layer virtual link is selected, the old OTN layer virtual link is split into two or three OTN layer virtual links, services in the newly established virtual link are converted into the split virtual link in the meantime, and the capacity is updated, and then the newly established virtual link is deleted. If P1>P2+P3, it indicates that the power consumption of the newly established OTN layer virtual link is smaller, and based on the principle of minimum power consumption, the newly established OTN layer virtual link is selected.

In the embodiment, the wavelength link in the path of the ODU service or STM service is converted into the virtual link, and the power consumptions between the newly established virtual link and the old virtual link are compared, the virtual link with the minimum power consumption is selected. The power consumption is taken as a weight between the nodes to complete the service path planning and wavelength allocation, so as to obtain a path with the minimum power consumption to implement the service routing, which is conducive to reducing the power consumption of the ODU service or STM service.

Figure 4:
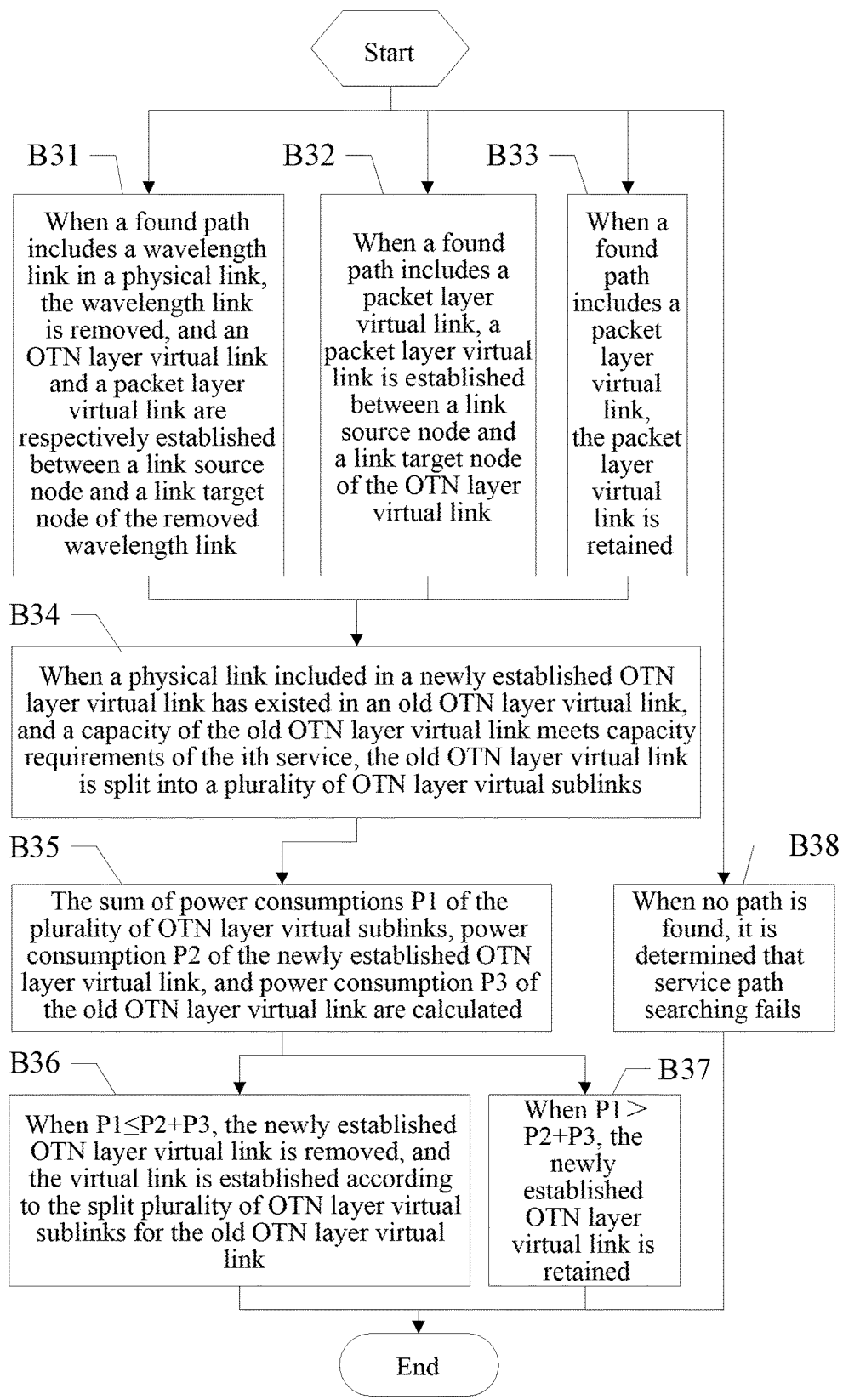
FIG. 4 is a flowchart of a grooming method for a packet optical transport network according to the fourth embodiment of the present invention.

As shown in FIG. 4, FIG. 4 is a flowchart of a grooming method for a packet optical transport network according to the fourth embodiment of the present invention. In the embodiment, based on the embodiment shown in FIG. 1, when the ith service is the ethernet service, the step B includes:

step B31, when a found path includes a wavelength link in a physical link, removing the wavelength link, and respectively establishing an OTN layer virtual link and a packet layer virtual link between a link source node and a link target node of the removed wavelength link;

step B32, when a found path includes a packet layer virtual link, establishing a packet layer virtual link between a link source node and a link target node of the OTN layer virtual link;

step B33, when a found path includes a packet layer virtual link, retaining the packet layer virtual link;

step B34, when a physical link comprised in a newly established OTN layer virtual link has existed in an old OTN layer virtual link, and a capacity of the old OTN layer virtual link meets capacity requirements of the ith service, splitting the old OTN layer virtual link into a plurality of OTN layer virtual sublinks;

step B35, calculating the sum of power consumptions P1 of the plurality of OTN layer virtual sublinks, power consumption P2 of the newly established OTN layer virtual link, and power consumption P3 of the old OTN layer virtual link;

step B36, when P1 ≤ P2+P3, removing the newly established OTN layer virtual link, and establishing the virtual link according to the plurality of split OTN layer virtual sublinks for the old OTN layer virtual link;

step B37, when P1>P2+P3, retaining the newly established OTN layer virtual link;

step B38, when no path is found, determining that service path searching fails, and executing the step E.

In the embodiment, when the type of service is the ethernet service, the following cases are included:

in the first case, if the found paths are all wavelength links, the wavelength links are removed, one OTN layer virtual link and one packet layer virtual link directly reaching a source node and a target node are respectively established;

in the second case, if the links passed by the path are all packet layer virtual links, the packet layer virtual links are retained; if the links passed by the path include the packet layer virtual links and the OTN layer virtual links, all OTN layer virtual link sets are found, and corresponding packet layer virtual links are established;

in the third case, if the links passed by the path are all OTN layer virtual links, one packet layer virtual link directly connecting a source node with a target node is established;

in the fourth case, if the links passed by the path include the wavelength links and the packet layer virtual links or OTN layer virtual links, or include two kinds of virtual links, firstly all wavelength link sets are found, the wavelength links are removed, and corresponding OTN layer virtual links are established, and then all OTN layer virtual link sets are found, and corresponding packet layer virtual links are established, at this point, each link respectively includes one OTN layer virtual link and one packet layer virtual link;

in the fifth case, if no path is found, it indicates that service path establishment fails, and service allocation is performed for the next service.

In the above cases, if the newly established OTN layer virtual link contains actual physical links and the physical links have been contained in a certain old OTN layer virtual link, and the capacity of the existing old OTN layer virtual link can meet the capacity requirements of the new service, it is assumed that the old OTN layer virtual link is split into two or three OTN layer virtual sublinks, the sum of power consumptions P1 consumed by the OTN layer virtual sublinks is calculated, and the sum of power consumptions P2+P3 consumed by the newly established OTN layer virtual link and the old OTN layer virtual link is calculated, and it is to compare P1 with P2+P3. If P1 ≤ P2+P3, it indicates that the power consumptions of the virtual sublinks are smaller, based on the principle of minimum power consumption, the old OTN layer virtual link is selected, and the old OTN layer virtual link is split into two or three OTN layer virtual links, services in the newly established virtual link are converted into the split virtual link in the meantime, and the capacity is updated, and then the newly established virtual link is deleted. If P1>P2+P3, it indicates that the power consumption of the newly established OTN layer virtual link is smaller, and based on the principle of minimum power consumption, the newly established OTN layer virtual link is selected.

In the embodiment, the wavelength link in the path of the ethernet service is converted into the virtual link, each link includes one OTN layer virtual link and one packet layer virtual link, and the power consumptions between the newly established OTN layer virtual link and the old OTN layer virtual link are compared, the virtual link with the minimum power consumption is selected, the power consumption is taken as a weight between the nodes to complete the service path planning and wavelength allocation, so as to obtain a path with the minimum power consumption to implement the service routing, which is conducive to reducing the power consumption of the ethernet service.

Alternatively, after the service path planning is completed, the power consumption of the completed path may be calculated in the following ways:

1. The power consumption $P_w$ required when the service is transmitted in the wavelength link set is:

$$P_w = \sum_{n=1}^{N} 2P_{OTNports-n} + \sum_{k=1}^{M} W_k + P_{Roadm} N_{newRoadm};$$

in the formula, N represents the number of physical links in the routing path, M represents the number of wavelength links, $P_{OTNports-n}$ represents the power consumption of the nth OTN port, $W_k$ is a weight of the kth wavelength link, $P_{Roadm}$ represents the power consumption of the nodes, and $N_{newRoadm}$ represents the number of nodes firstly used in the routing path.

2. The power consumption $P_t$ of the OCH service is:

$$P_t = \sum_{k=1}^{M} W_k + P_{Roadm} N_{newRoadm};$$

3. The power consumption $P_t$ of the ODU service or STM service is:

(1) when the routing paths are all wavelength links:

$$P_t = \sum_{k=1}^{M} W_k + P_{Roadm} N_{newRoadm} + 2 \times P_{OTNports};$$

(2) when the routing paths are all virtual links:

$P_t = W_{v1} N_{v1};$ in the formula, $W_{v1}$ represents a weight of the OTN layer virtual link, and $N_{v1}$ represents the number of OTN layer virtual links.

(3) when the routing paths are composed of wavelength links and virtual links:

$P_t = W_{v1} N_{v1} + P_w.$

4. The power consumption $P_t$ of the ethernet service is:

(1) when the routing paths are all wavelength links:

$$P_t = \sum_{k=1}^{M} W_k + P_{Roadm} N_{newRoadm} + 2 \times P_{OTNports} + 2 \times P_{ports};$$

in the formula, $P_{ports}$ represents the power consumption of the router ports.

(2) when the routing paths are all packet layer virtual links:

$P_t = W_{v2} N_{v2};$ in the formula, $W_{v2}$ represents a weight of the packet layer virtual link, and $N_{v2}$ represents the number of packet layer virtual links.

(3) when the routing paths include both the packet layer virtual links and the OTN layer virtual links:

$$P_t = W_{v1} N_{v1} + W_{v2} N_{v2} + \sum_{g=1}^{n_{v1}} 2P_{ports-g};$$

in the formula, $n_{v1}$ represents the number of the packet layer virtual links composed of the OTN layer virtual links and the wavelength links.

(4) when the routing paths include the wavelength links, and also include the packet layer virtual links and the OTN layer virtual links:

$$P_t = W_{v1} N_{v1} + W_{v2} N_{v2} + \sum_{g=1}^{n_{v1}} 2P_{ports-g} + P_W.$$

The following embodiments may refer to FIG. 5 to FIG. 10 together. It is assumed that each link represents one pair of unidirectional optical fibers with same bandwidth and opposite direction, each optical fiber has 4 waves, namely 4 wavelength links, the maximum bandwidth of each wave is 40 G, the number of amplifiers in each optical fiber is 2, the power consumption consumed by the transmitter is $P_T$, the power consumption consumed by the receiver is $P_R$, and the power consumption consumed by the amplifier is $P_{EDFA}$, then the weight in each physical ink is $W=P_T+P_R+2P_{EDFA}$, and it is assumed that all service connection requests, wavelength links and virtual links are bidirectional.

Figures 5, 6:
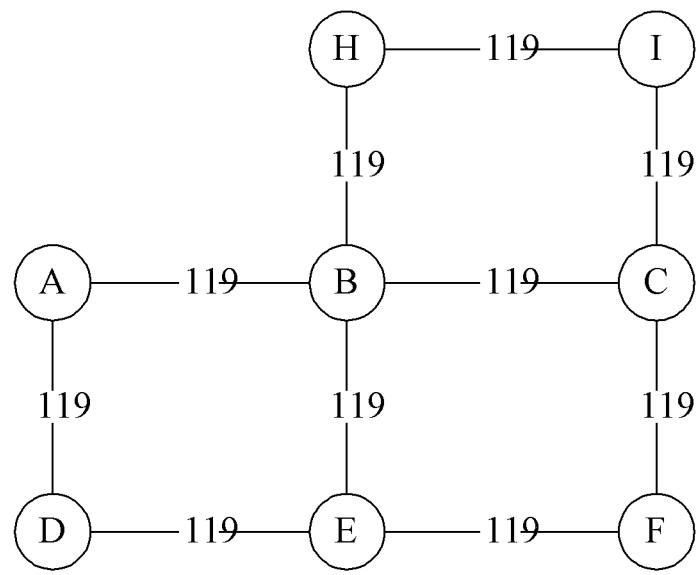
FIG. 5 is a data table of power consumptions of network devices in the embodiment of the present invention.
FIG. 6 is a topology set graph of a POTN network in the embodiment of the present invention.

FIG. 5 is a data table of power consumptions of network devices in the embodiment of the present invention. FIG. 6 is a topology set graph of the POTN network in the embodiment of the present invention. FIG. 7 is an information table of services to be planned in the embodiment of the present invention. FIG. 8 is a table of actual physical links and virtual links passed by the services in the embodiment of the present invention. FIG. 9 is an information table of virtual links in the embodiment of the present invention. FIG. 10 is a planned topology set graph in the embodiment of the present invention, including the wavelength links and the virtual links in the physical links.

Firstly the topology set graph is initialized, and the topology set graph shown in FIG. 6 is obtained, and values of the link weight are noted in various links in the figure. Moreover, various services are sorted, and the information table of sorted services to be planned according to the requirement shown in FIG. 7 is obtained, here it is assumed that all services are unprotected, and the path searching methods in the case with protection and the case without protection are same.

The path planning is performed for all services, firstly a service 1 is selected, the service 1 is an OCH service, the path searching is performed based on the Dijkstra algorithm in the set graph, the found paths are A-D, D-E and E-F, one wave in each of the three links is respectively occupied, thus three waves are left in each of the A-D, D-E and E-F at this point. One OTN layer virtual link A-F is established, and the physical links passed are the A-D, D-E and E-F. Since the OCH service is directly borne in the wave to be transmitted, the remaining capacity of the virtual link is 0, and new services cannot be contained any more. The newly established OTN layer virtual link A-F and the corresponding weight are added into the topology set graph, and the capacity of the virtual link is updated in the meantime, the power consumption consumed by the service 1 is calculated, and the planning of the service 1 is completed.

For the service 2, it is an ODU service, the paths found based on the Dijkstra algorithm in the set graph are A-B and B-C. Since the capacity of the virtual link A-F is 0, the link is not selected. An OTN layer virtual link A-C is newly established, and the physical links passed are the A-B and B-C, three waves are left in each link, the newly established OTN layer virtual link A-C and the corresponding weight are added into the topology set graph, and the capacity of the virtual link is updated in the meantime. An advanced ODU in the wave is an ODU2, the remaining capacity of the advanced ODU2 is 0, the power consumption consumed by the service 2 is calculated, and the planning of the service 2 is completed.

For the service 3, the found paths are A-C and C-I, and the A-C is an OTN layer virtual link and the C-I is an actual physical link. An OTN layer virtual link C-I is newly established, and the physical link passed is the C-I, the capacities of the virtual links A-C and C-I are updated. The ODU multiplexing is performed in the A-C, the ODU is expanded to an ODU3, two ODU2s are installed in the ODU3, an advanced ODU container in the virtual link C-I is an ODU2, the newly established virtual link C-I and the corresponding weight are added into the topology set graph, the power consumption consumed by the service 3 is calculated, and the planning of the service 3 is completed.

The service path planning and wavelength allocation are also performed based on the above steps for other services. With regard to the ethernet service, it is not only required to establish an OTN layer virtual link, but also required to establish an ODU pipeline namely a packet layer virtual link. Finally the topology set graph shown in FIG. 10 is obtained, and a path is selected according to the planned topology set graph in the service routing, which is conducive to reducing the power consumption of services, thereby optimizing the power consumption of the entire network to the greatest extent.

Figure 11:
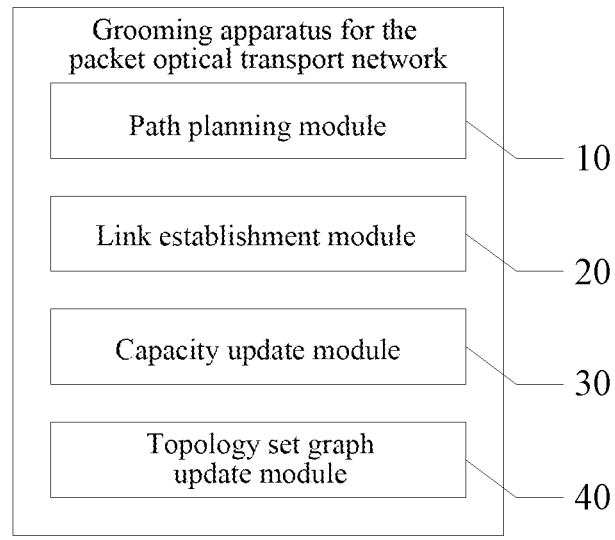
FIG. 11 is a schematic diagram of a structure of a grooming apparatus for a packet optical transport network according to the first embodiment of the present invention.

As shown in FIG. 11, FIG. 11 is a schematic diagram of a structure of a grooming apparatus for a packet optical transport network according to the first embodiment of the present invention. The grooming apparatus for the packet optical transport network mentioned in the embodiment includes:

a path planning module 10, configured to: according to an arrangement order of various services, plan a path from a service source node to a service target node in an ith service in a topology set graph; wherein an initial value of i is 1;

a link establishment module 20, configured to: when the path includes a wavelength link in a physical link, remove the wavelength link, and establish a virtual link between a link source node and a link target node of the removed wavelength link;

a capacity update module 30, configured to: update capacities of various links in the path; and a topology set graph update module 40, configured to: calculate a weight of the newly established virtual link, and add the newly established virtual link and the corresponding weight to the topology set graph, wherein, i is a positive integer.

In the embodiment, the POTN network is mainly divided into three layers: a packet layer, an OTN layer and a WDM layer. The topology of the WDM layer is a physical topology of the entire network in essence, the OTN layer is a virtual topology composed of optical paths, the packet layer is a virtual topology composed of ODU pipelines. Since paths that may be found in the path searching of the embodiment include physical links and virtual links, the three topologies are assembled together to form a topology set graph. When the POTN network is planned, the following condition is taken as a limitation: the topological structure of the POTN network has been known according to the practical applications, including the number of nodes and the node connectivity situation; there may be a plurality of physical links between the nodes in the topology of the POTN network, and each physical link has two optical fibers in opposite direction; and one optical fiber in the topology of the POTN network has a plurality of waves, namely wavelength links, and the number of waves in each optical fiber is not always equal. Since the virtual link represents a routing path that has been established in the physical topology, and if a new service connection request in the routing needs to use such segment of virtual link, as long as the capacity of the link allows, the routing in the link does not need any power consumption. Therefore, the wavelength link included in the path planned in the embodiment is removed, and the virtual link is established between the nodes at the two ends of the removed wavelength link, thus during the service routing, the power consumptions of the physical link and the virtual link are taken as the weight, and the service routing is performed according to the principle of minimum power consumption, which is conducive to reducing the power consumption of the service routing.

After the replanning of the path is completed, the service capacity is deducted from the capacity of the links (including the physical links and the virtual links) passed by the routing, and the remaining capacity of the links is obtained, to prepare for checking whether there is enough remaining capacity to meet the requirements of the service capacity when it is to plan a path of the next service in the following. Moreover, if the remaining capacity in the links cannot meet the requirements of the service capacity, in order to ensure smooth routing of the service, virtual links whose remaining capacity is less than the service capacity may be deleted. For example, when the service is the OCH service, all virtual links whose remaining capacity is less than the service capacity are deleted, and when the service is the ODU service or STM service, all packet layer virtual links whose remaining capacity is less than the service capacity are deleted. In the embodiment, when the capacity of the virtual link allows, the routing in the link does not need any power consumption, thus the weight of the virtual link may be represented as: a weight $W_{v1}=0.01$ of the OTN layer virtual link and a weight $W_{v2}=0$ of the packet layer virtual link. The newly established virtual link and the corresponding weight are added to the topology set graph for the path searching of the next service, and the planning of the current service is finished.

In the embodiment, the wavelength link in the path is converted into the virtual link, the service path planning and wavelength allocation are finished with the power consumption as a weight between the nodes, so as to obtain a path with the minimum power consumption to implement the service routing, which is conducive to reducing the power consumption of services, thereby optimizing the power consumption of the entire network to the greatest extent.

Alternatively, when the ith service is an OCH service, the link establishment module 20 is configured to:

when a found path includes a wavelength link in a physical link, remove the wavelength link, and establish an OTN layer virtual link between a link source node and a link target node of the removed wavelength link; and when no path is found, determine that service path searching fails.

In the embodiment, when the type of service is the OCH service, since the OCH service is arranged at the first place during the sorting, all found paths are basically wavelength links at this point. The wavelength links refer to one wave contained in the physical link, and these wavelength links are removed, that is, the wave is deleted from the corresponding physical link, and one OTN layer virtual link directly connecting a source node with a target node is established. If no path is found, it indicates that the service path establishment fails, and the path planning of the next service is performed.

In the embodiment, the wavelength link in the path of the OCH service is converted into the virtual link, the service path planning and wavelength allocation are finished with the power consumption as a weight between the nodes, so as to obtain a path with the minimum power consumption to implement the service routing, which is conducive to reducing the power consumption of the OCH service.

Alternatively, when the ith service is an ODU service or an STM service, the link establishment module 20 is configured to:

when a found path includes a wavelength link in a physical link, remove the wavelength link, and establish an OTN layer virtual link between a link source node and a link target node of the removed wavelength link;

when a found path includes an OTN layer virtual link, retain the OTN layer virtual link;

when a physical link included in a newly established OTN layer virtual link has existed in an old OTN layer virtual link, and a capacity of the old OTN layer virtual link meets capacity requirements of the ith service, split the old OTN layer virtual link into a plurality of OTN layer virtual sublinks;

calculate the sum of power consumptions P1 of the plurality of OTN layer virtual sublinks, power consumption P2 of the newly established OTN layer virtual link, and power consumption P3 of the old OTN layer virtual link;

when $P1 \leq P2+P3$, remove the newly established OTN layer virtual link, and establish the virtual link according to the plurality of split OTN layer virtual sublinks for the old OTN layer virtual link;

when $P1>P2+P3$, retain the newly established OTN layer virtual link; and when no path is found, determine that service path searching fails.

In the embodiment, when the type of service is the ODU service or STM service, the following cases are included:

in the first case, if the found paths are all wavelength links, the wavelength links are removed, and one OTN layer virtual link directly connecting a source node with a target node is established;

in the second case, if the links passed by the path are all OTN layer virtual links, the OTN layer virtual links are retained;

in the third case, if the links passed by the path include the wavelength links and the OTN layer virtual links, all wavelength link sets are found, the wavelength links are removed, and corresponding OTN layer virtual links are established;

in the fourth case, if no path is found, it indicates that the service path establishment fails, and the path planning of the next service is performed.

In the above cases, if the newly established OTN layer virtual link contains actual physical links, and the physical links have been contained in a certain old OTN layer virtual link, and the capacity of the existing old OTN layer virtual link can meet the capacity requirements of the new service, it is assumed that the old OTN layer virtual link is split into two or three OTN layer virtual sublinks, the sum of power consumptions P1 consumed by the OTN layer virtual sublinks is calculated, and the sum of power consumptions P2+P3 consumed by the newly established OTN layer virtual link and the old OTN virtual link is calculated, and it is to compare P1 with P2+P3. If $P1 \leq P2+P3$, it indicates that the power consumptions of the virtual sublinks are smaller, based on the principle of minimum power consumption, the old OTN layer virtual link is selected, the old OTN layer virtual link is split into two or three OTN layer virtual links, services in the newly established virtual link are converted into the split virtual link in the meantime, and the capacity is updated, and then the newly established virtual link is deleted. If $P1>P2+P3$, it indicates that the power consumption of the newly established OTN layer virtual link is smaller, and based on the principle of minimum power consumption, the newly established OTN layer virtual link is selected.

In the embodiment, the wavelength link in the path of the ODU service or STM service is converted into the virtual link, and the power consumptions between the newly established virtual link and the old virtual link are compared, the virtual link with the minimum power consumption is selected, the power consumption is taken as a weight between the nodes to complete the service path planning and wavelength allocation, so as to obtain a path with the minimum power consumption to implement the service routing, which is conducive to reducing the power consumption of the ODU service or STM service.

Alternatively, when the ith service is an ethernet service, the link establishment module 20 is configured to:

when a found path includes a wavelength link in a physical link, remove the wavelength link, and respectively establish an OTN layer virtual link and a packet layer virtual link between a link source node and a link target node of the removed wavelength link;

when a found path includes a packet layer virtual link, establish a packet layer virtual link between a link source node and a link target node of the OTN layer virtual link;

when a found path includes a packet layer virtual link, retain the packet layer virtual link;

when a physical link included in a newly established OTN layer virtual link has existed in an old OTN layer virtual link, and a capacity of the old OTN layer virtual link meets capacity requirements of the ith service, split the old OTN layer virtual link into a plurality of OTN layer virtual sublinks;

calculate the sum of power consumptions P1 of the plurality of OTN layer virtual sublinks, power consumption P2 of the newly established OTN layer virtual link, and power consumption P3 of the old OTN layer virtual link;

when $P1 \leq P2+P3$, remove the newly established OTN layer virtual link, and establish the virtual link according to the plurality of split OTN layer virtual sublinks for the old OTN layer virtual link;

when $P1>P2+P3$, retain the newly established OTN layer virtual link; and when no path is found, determine that service path searching fails.

In the embodiment, when the type of service is the ethernet service, the following cases are included:

in the first case, if the paths found are all wavelength links, the wavelength links are removed, one OTN layer virtual link and one packet layer virtual link directly reaching a source node and a target node are respectively established;

in the second case, if the links passed by the path are all packet layer virtual links, the packet layer virtual links are retained; if the links passed by the path include the packet layer virtual links and the OTN layer virtual links, all OTN layer virtual link sets are found, and corresponding packet layer virtual links are established;

in the third case, if the links passed by the path are all OTN layer virtual links, one packet layer virtual link directly connecting a source node with a target node is established;

in the fourth case, if the links passed by the path include the wavelength links and the packet layer virtual links or OTN layer virtual links, or include both the two kinds of virtual links, firstly all wavelength link sets are found, the wavelength links are removed, and corresponding OTN layer virtual links are established, and then all OTN layer virtual link sets are found, and corresponding packet layer virtual links are established, at this point, each link respectively includes one OTN layer virtual link and one packet layer virtual link;

in the fifth case, if no path is found, it indicates that service path establishment fails, and service allocation is performed for the next service.

In the above cases, if the newly established OTN layer virtual link contains actual physical links, and the physical links have been contained in a certain old OTN layer virtual link, and the capacity of the existing old OTN layer virtual link can meet the capacity requirements of the new service, it is assumed that the old OTN layer virtual link is split into two or three OTN layer virtual sublinks, the sum of power consumptions P1 consumed by the OTN layer virtual sublinks is calculated, and the sum of power consumptions P2+P3 consumed by the newly established OTN layer virtual link and the old OTN layer virtual link is calculated, and it is to compare P1 with P2+P3. If P1 ≤ P2+P3, it indicates that the power consumptions of the virtual sublinks are smaller, based on the principle of minimum power consumption, the old OTN layer virtual link is selected, the old OTN layer virtual link is split into two or three OTN layer virtual links, services in the newly established virtual link are converted into the split virtual link in the meantime, and the capacity is updated, and then the newly established virtual link is deleted. If P1>P2+P3, it indicates that the power consumption of the newly established OTN layer virtual link is smaller, and based on the principle of minimum power consumption, the newly established OTN layer virtual link is selected.

In the embodiment, the wavelength link in the path of the ethernet service is converted into the virtual link, each link includes one OTN layer virtual link and one packet layer virtual link, and the power consumptions between the newly established OTN layer virtual link and the old OTN layer virtual link are compared, and the virtual link with the minimum power consumption is selected, the power consumption is taken as a weight between the nodes to complete the service path planning and wavelength allocation, so as to obtain a path with the minimum power consumption to implement the service routing, which is conducive to reducing the power consumption of the ethernet service.

Figure 12:
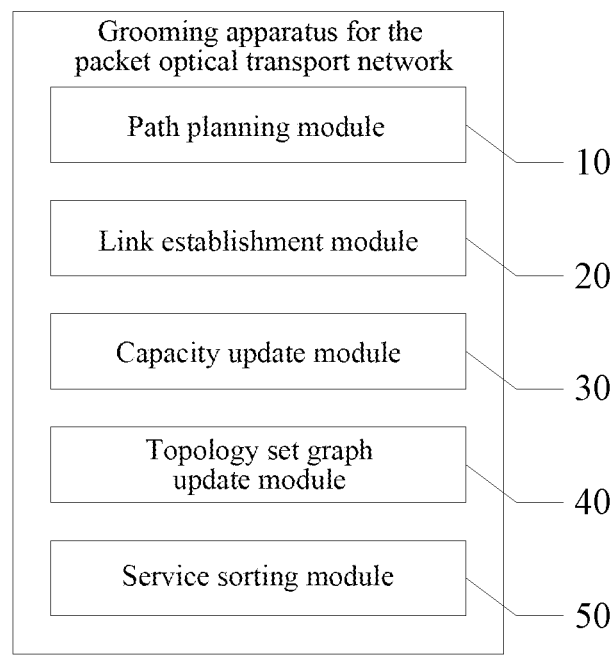
FIG. 12 is a schematic diagram of a structure of a grooming apparatus for a packet optical transport network according to the second embodiment of the present invention.

As shown in FIG. 12, FIG. 12 is a schematic diagram of a structure of a grooming apparatus for a packet optical transport network according to the second embodiment of the present invention. In the embodiment, based on the embodiment shown in FIG. 11, a service sorting module 50 is added, and it is configured to:

sort categories of various services, and arrange OCH services at first place, ODU services and STM services at second place, and ethernet services at last place; and orderly arrange the OCH services from large to small according to service capacities, orderly arrange the ODU services and STM services from large to small according to service capacities, and orderly arrange the ethernet services from high to low according to priorities.

Before the path is planned, various services are sorted, and they are sorted according to categories of various services, the OCH services are arranged at first place, followed by the ODU services and STM services, and the ethernet services are arranged at last place. The OCH services are orderly arranged from large to small according to service capacities, the ODU services and STM services are orderly arranged from large to small according to service capacities, and the ethernet services are orderly arranged from high to low according to priorities. According to an arranged order, starting from the first service, one service is selected to perform path planning, and the Dijkstra's algorithm is adopted to perform the path searching in the topology set graph. In addition, one duplicate graph may be firstly established according to the topology set graph, and the path searching is performed in the duplicate graph.

Alternatively, the topology set graph update module 40 is also configured to:

calculate a weight $W_j = P_T + N_0 \times P_A + P_R$ of a jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and update the weight $W_j$ of the jth segment of physical link to a corresponding physical link in the topology set graph.

The path planned in the topology set graph may include wavelength links and/or virtual links in the physical link. In the stage of network initialization, weights of various links in the topology set graph are calculated. Since the capacity of the wavelength channel in the initial state is not occupied, the sides are all actual physical links at this point. The power consumption is taken as a weight between the nodes in the embodiment, the power consumption occupied by the physical link normally include the sum of power consumptions of an optical transmitter, optical amplifier and optical receiver in the link, and a weight $W_j = P_T + N_0 \times P_A + P_R$ of a jth segment of physical link in the topology set graph is calculated, wherein, $P_T$ is the power consumption of the optical transmitter in the jth segment of physical link, $P_A$ is the power consumption of the optical amplifier in the jth segment of physical link, $P_R$ is the power consumption of the optical receiver in the jth segment of physical link, and $N_0$ is the number of optical amplifiers in the jth segment of physical link. Here the value of the $N_0$ may be decided based on a ratio of an actual length of the link to the intervals amplifiers are placed at. The weight $W_j$ of the jth segment of physical link is updated to a corresponding physical link in the topology set graph, and the initialization of the topology set graph is completed.

Alternatively, after the service path planning is completed, the power consumption of the completed path may be calculated in the following ways.

1. The power consumption $P_w$ required when the service is transmitted in the wavelength link set is:

$$P_w = \sum_{n=1}^{N} 2P_{OTNports-n} + \sum_{k=1}^{M} W_k + P_{Roadm} N_{newRoadm};$$

in the formula, N represents the number of physical links in the routing path, M represents the number of wavelength links, $P_{OTNports-n}$ represents the power consumption of the nth OTN port, $W_k$ is a weight of the kth wavelength link, $P_{Roadm}$ represents the power consumption of the nodes, and $N_{newRoadm}$ represents the number of nodes firstly used in the routing path.

2. The power consumption $P_t$ of the OCH service is:

$$P_t = \sum_{k=1}^{M} W_k + P_{Roadm} N_{newRoadm};$$

3. The power consumption $P_t$ of the ODU service or STM service is:
(1) when the routing paths are all wavelength links:

$$P_t = \sum_{k=1}^{M} W_k + P_{Roadm} N_{newRoadm} + 2 \times P_{OTNports};$$

(2) when the routing paths are all virtual links:

$$P_t = W_{v1} N_{v1};$$

in the formula, $W_{v1}$ represents a weight of the OTN layer virtual link, and $N_{v1}$ represents the number of OTN layer virtual links.

(3) when the routing paths are composed of wavelength links and virtual links:

$$P_t = W_{v1} N_{v1} + P_w.$$

4. The power consumption $P_t$ of the ethernet service is:
(1) when the routing paths are all wavelength links:

$$P_t = \sum_{k=1}^{M} W_k + P_{Roadm} N_{newRoadm} + 2 \times P_{OTNports} + 2 \times P_{ports};$$

in the formula, $P_{ports}$ represents the power consumption of the router ports.

(2) when the routing paths are all packet layer virtual links:

$$P_t = W_{v2} N_{v2};$$

in the formula, $W_{v2}$ represents a weight of the packet layer virtual link, and $N_{v2}$ represents the number of packet layer virtual links.

(3) when the routing paths include both the packet layer virtual links and the OTN layer virtual links:

$$P_t = W_{v1} N_{v1} + W_{v2} N_{v2} + \sum_{g=1}^{n_{v1}} 2 P_{ports-g};$$

in the formula, $n_{v1}$ represents the number of the packet layer virtual links composed of the OTN layer virtual links and the wavelength links.

(4) when the routing paths include the wavelength links, and also include the packet layer virtual links and the OTN layer virtual links:

$$P_t = W_{v1} N_{v1} + W_{v2} N_{v2} + \sum_{g=1}^{n_{v1}} 2 P_{ports-g} + P_W.$$

The ordinary person skilled in the art can understand that all or part of the steps in the above method can be completed by a program instructing related hardware, and the program can be stored in a computer readable memory medium, such as a read-only memory, magnetic disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The present document is not limited to any combination of hardware and software in a specific form.

The above description is only the preferred embodiments of the present invention, which does not limit the patent scope of the embodiments of the present invention due to this. Equivalent structures or equivalent flow transformations made by using the contents of the descriptions and accompanying drawings of the present document, or equivalent structures or equivalent flow transformations directly or indirectly applied in other related technical fields, are all also included in the patent protection scope of the present document.

INDUSTRIAL APPLICABILITY

In the embodiments of the present invention, the wavelength link in the path is converted into the virtual link, the service path planning and wavelength allocation are finished with the power consumption as a weight between the nodes, so as to obtain a path with the minimum power consumption to implement the service routing, which is conducive to reducing the power consumption of services, thereby optimizing the power consumption of the entire network to the greatest extent.

What is claimed is:
1. A grooming method for a packet optical transport network, comprising:
   step A, according to an arrangement order of various services, planning a path from a service source node to a service target node in an ith service in a topology set graph; wherein an initial value of i is 1; wherein, the path planned in the topology set graph includes wavelength links and/or virtual links in a physical link; the method further comprising:
   before the step A, sorting categories of various services, and arranging OCH services at first place, ODU services and STM services at second place, and ethernet services at last place; and
   orderly arranging the OCH services from large to small according to service capacities, orderly arranging the ODU services and STM services from large to small according to service capacities, and orderly arranging the ethernet services from high to low according to priorities;
   before the step A, the method further comprising:
   calculating a weight $W_j$ of a jth segment of physical link in the topology set graph; and
   updating the weight $W_j$ of the jth segment of physical link to a corresponding physical link in the topology set graph;
   step B, when the path comprises a wavelength link in the physical link, removing the wavelength link, and establishing a virtual link between a link source node and a link target node of the removed wavelength link; wherein, during service routing, power consumptions of the physical link and the virtual link are taken as the weight, and the service routing is performed according to the principle of minimum power consumption, which is conducive to reducing the power consumption of the service routing;

step C, updating capacities of various links in the path; wherein, the capacity of the link is deducted from the capacity of the physical links and the virtual links passed by the routing;

step D, calculating a weight of a newly established virtual link, and adding the newly established virtual link and the corresponding weight to the topology set graph; and step E, if i+1, returning to the step A, until all services are finished, wherein, i is a positive integer.

2. The grooming method for the packet optical transport network according to claim 1, wherein, when the ith service is an optical channel OCH service, the step B comprises:

step B11, when a found path comprises a wavelength link in a physical link, removing the wavelength link, and establishing an optical transport network OTN layer virtual link between a link source node and a link target node of the removed wavelength link; and step B12, when no path is found, determining that service path searching fails, and executing the step E.

3. The grooming method for the packet optical transport network according to claim 1, wherein, when the ith service is an oracle database unloader ODU service or a synchronous transport module STM service, the step B comprises:

step B21, when a found path comprises a wavelength link in a physical link, removing the wavelength link, and establishing an OTN layer virtual link between a link source node and a link target node of the removed wavelength link;

step B22, when a found path comprises an OTN layer virtual link, retaining the OTN layer virtual link;

step B23, when a physical link comprised in a newly established OTN layer virtual link has existed in an old OTN layer virtual link, and a capacity of the old OTN layer virtual link meets capacity requirements of the ith service, splitting the old OTN layer virtual link into a plurality of OTN layer virtual sublinks;

step B24, calculating the sum of power consumptions P1 of the plurality of OTN layer virtual sublinks, power consumption P2 of the newly established OTN layer virtual link and power consumption P3 of the old OTN layer virtual link;

step B25, when P1≤P2+P3, removing the newly established OTN layer virtual link, and establishing a virtual link according to the plurality of split OTN layer virtual sublinks for the old OTN layer virtual link;

step B26, when P1>P2+P3, retaining the newly established OTN layer virtual link; and step B27, when no path is found, determining that service path searching fails, and executing the step E.

4. The grooming method for the packet optical transport network according to claim 1, wherein, when the ith service is an ethernet service, the step B comprises:

step B31, when a found path comprises a wavelength link in a physical link, removing the wavelength link, and respectively establishing an OTN layer virtual link and a packet layer virtual link between a link source node and a link target node of the removed wavelength link;

step B32, when a found path comprises a packet layer virtual link, establishing a packet layer virtual link between a link source node and a link target node of the OTN layer virtual link;

step B33, when a found path comprises a packet layer virtual link, retaining the packet layer virtual link;

step B34, when a physical link comprised in a newly established OTN layer virtual link has existed in an old OTN layer virtual link, and a capacity of the old OTN layer virtual link meets capacity requirements of the ith service, splitting the old OTN layer virtual link into a plurality of OTN layer virtual sublinks;

step B35, calculating the sum of power consumptions P1 of the plurality of OTN layer virtual sublinks, power consumption P2 of the newly established OTN layer virtual link, and power consumption P3 of the old OTN layer virtual link;

step B36, when P1≤P2+P3, removing the newly established OTN layer virtual link, and establishing a virtual link according to the plurality of split OTN layer virtual sublinks for the old OTN layer virtual link;

step B37, when P1>P2+P3, retaining the newly established OTN layer virtual link; and step B38, when no path is found, determining that service path searching fails, and executing the step E.

5. The grooming method for the packet optical transport network according to claim 1, wherein:

calculating the weight $W_j = P_T + N_0 \times P_A + P_R$ of the jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and updating the weight $W_j$ of the jth segment of physical link to a corresponding physical link in the topology set graph, wherein, j and $N_0$ are positive integers.

6. A grooming apparatus for a packet optical transport network, comprising hardware performing instructions stored in a non-transitory computer readable medium which executes steps in the following modules:

a service sorting module, configured to: sort categories of various services, and arrange OCH services at first place, ODU services and STM services at second place, and ethernet services at last place; and orderly arrange the OCH services from large to small according to service capacities, orderly arrange the ODU services and STM services from large to small according to service capacities, and orderly arrange the ethernet services from high to low according to priorities;

a path planning module, configured to: according to an arrangement order of various services, plan a path from a service source node to a service target node in an ith service in a topology set graph; wherein an initial value of i is 1; wherein, the path planned in the topology set graph includes wavelength links and/or virtual links in a physical link;

a link establishment module, configured to: when the path comprises a wavelength link in a physical link, remove the wavelength link, and establish a virtual link between a link source node and a link target node of the removed wavelength link; wherein, during service routing, power consumptions of the physical link and the virtual link are taken as the weight, and the service routing is performed according to the principle of minimum power consumption, which is conducive to reducing the power consumption of the service routing;

a capacity update module, configured to: update capacities of various links in the path; wherein, the capacity of the link is deducted from the capacity of the physical links and the virtual links passed by the routing; and a topology set graph update module, configured to: calculate a weight of a newly established virtual link, and add the newly established virtual link and the corresponding weight to the topology set graph, wherein, i is a positive integer; wherein, the topology set graph update module is further configured to:

calculate a weight $W_j$ of a jth segment of physical link in the topology set graph; and update the weight $W_j$ of the jth segment of physical link to a corresponding physical link in the topology set graph.

7. The grooming apparatus for the packet optical transport network according to claim 6, wherein, when the ith service is an optical channel OCH service, the link establishment module is configured to:

when a found path comprises a wavelength link in a physical link, remove the wavelength link, and establish an optical transport network OTN layer virtual link between a link source node and a link target node of the removed wavelength link; and when no path is found, determine that service path searching fails.

8. The grooming apparatus for the packet optical transport network according to claim 6, wherein, when the ith service is an oracle database unloader ODU service or a synchronous transport module STM service, the link establishment module is configured to:

when a found path comprises a wavelength link in a physical link, remove the wavelength link, and establish an OTN layer virtual link between a link source node and a link target node of the removed wavelength link;

when a found path comprises an OTN layer virtual link, retain the OTN layer virtual link;

when a physical link comprised in a newly established OTN layer virtual link has existed in an old OTN layer virtual link, and a capacity of the old OTN layer virtual link meets capacity requirements of the ith service, split the old OTN layer virtual link into a plurality of OTN layer virtual sublinks;

calculate the sum of power consumptions P1 of the plurality of OTN layer virtual sublinks, power consumption P2 of the newly established OTN layer virtual link and power consumption P3 of the old OTN layer virtual link;

when P1≤P2+P3, remove the newly established OTN layer virtual link, and establish a virtual link according to the plurality of split OTN layer virtual sublinks for the old OTN layer virtual link;

when P1>P2+P3, retain the newly established OTN layer virtual link; and when no path is found, determine that service path searching fails.

9. The grooming apparatus for the packet optical transport network according to claim 6, wherein, when the ith service is an ethernet service, the link establishment module is configured to:

when a found path comprises a wavelength link in a physical link, remove the wavelength link, and respectively establish an OTN layer virtual link and a packet layer virtual link between a link source node and a link target node of the removed wavelength link;

when a found path comprises a packet layer virtual link, establish a packet layer virtual link between a link source node and a link target node of the OTN layer virtual link;

when a found path comprises a packet layer virtual link, retain the packet layer virtual link;

when a physical link comprised in a newly established OTN layer virtual link has existed in an old OTN layer virtual link, and a capacity of the old OTN layer virtual link meets capacity requirements of the ith service, split the old OTN layer virtual link into a plurality of OTN layer virtual sublinks;

calculate the sum of power consumptions P1 of the plurality of OTN layer virtual sublinks, power consumption P2 of the newly established OTN layer virtual link and power consumption P3 of the old OTN layer virtual link;

when P1≤P2+P3, remove the newly established OTN layer virtual link, and establish a virtual link according to the plurality of split OTN layer virtual sublinks for the old OTN layer virtual link;

when P1>P2+P3, retain the newly established OTN layer virtual link; and when no path is found, determine that service path searching fails.

10. The grooming apparatus for the packet optical transport network according to claim 6, wherein, the topology set graph update module is further configured to:

calculate the weight $W_j = P_T + N_0 \times P_A + P_R$ of the jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and update the weight $W_j$ of the jth segment of physical link to a corresponding physical link in the topology set graph, wherein, j and $N_0$ are positive integers.

11. The grooming method for the packet optical transport network according to claim 2, wherein:

calculating the weight $W_j = P_T + N_0 \times P_A + P_R$ of the jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and updating the weight $W_j$ of the jth segment of physical link to a corresponding physical link in the topology set graph, wherein, j and $N_0$ are positive integers.

12. The grooming method for the packet optical transport network according to claim 3, wherein:

calculating the weight $W_j = P_T + N_0 \times P_A + P_R$ of the jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and updating the weight $W_j$ of the jth segment of physical link to a corresponding physical link in the topology set graph, wherein, j and $N_0$ are positive integers.

13. The grooming method for the packet optical transport network according to claim 4, wherein:
calculating the weight $W_j=P_T+N_0\times P_A+P_R$ of the jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and
updating the weight $W_j$ of the jth segment of physical link to a corresponding physical link in the topology set graph, wherein, j and $N_0$ are positive integers.

14. The grooming apparatus for the packet optical transport network according to claim 7, wherein, the topology set graph update module is further configured to:
calculate the weight $W_j=P_T+N_0\times P_A+P_R$ of the jth segment of physical link in the topology set graph; wherein $P_T$ is power consumption of an optical transmitter in the jth segment of physical link, $P_A$ is power consumption of an optical amplifier in the jth segment of physical link, $P_R$ is power consumption of an optical receiver in the jth segment of physical link, and $N_0$ is the number of optical amplifiers in the jth segment of physical link; and
update the weight $W_j$ of the jth segment of physical link to a corresponding physical link in the topology set graph, wherein, j and $N_0$ are positive integers.

* * * * *